(12) United States Patent
Singh et al.

(10) Patent No.: US 9,963,146 B2
(45) Date of Patent: May 8, 2018

(54) TIRE LIFT-OFF PROPENSITY PREDICTIVE SYSTEM AND METHOD

(71) Applicant: The Goodyear Tire & Rubber Company, Akron, OH (US)

(72) Inventors: Kanwar Bharat Singh, Lorenztweiler (LU); Anthony William Parsons, Domeldange (LU); Marc Engel, Bissen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days. days.

(21) Appl. No.: 15/609,091

(22) Filed: May 31, 2017

(65) Prior Publication Data

US 2017/0320494 A1    Nov. 9, 2017

Related U.S. Application Data

(63) Continuation-in-part of application No. 14/558,783, filed on Dec. 3, 2014, now abandoned.

(51) Int. Cl.
*B60W 30/14* (2006.01)
*B60C 23/04* (2006.01)

(52) U.S. Cl.
CPC .......... *B60W 30/143* (2013.01); *B60C 23/04* (2013.01); *B60W 2520/10* (2013.01); *B60W 2530/20* (2013.01); *B60W 2720/10* (2013.01)

(58) Field of Classification Search
CPC .................................................. G01M 17/02
See application file for complete search history.

(56) References Cited

U.S. PATENT DOCUMENTS

| | | |
|---|---|---|
| 6,539,295 B1 | 3/2003 | Katzen et al. |
| 6,637,276 B2 | 10/2003 | Adderton et al. |
| 6,697,726 B2 | 2/2004 | Takagi et al. |
| 6,962,075 B2 | 11/2005 | Bertrand |
| 7,130,735 B2 | 10/2006 | Brown et al. |
| 7,404,317 B2 | 7/2008 | Mancosu et al. |
| 7,546,764 B2 | 6/2009 | Morinaga |
| 7,552,628 B2 | 6/2009 | Mancosu |
| 9,050,864 B2 | 6/2015 | Singh et al. |
| 9,222,854 B2 | 12/2015 | Singh et al. |
| 2002/0059023 A1 | 5/2002 | Takagi et al. |
| 2003/0236603 A1 | 12/2003 | Lu |
| 2004/0199314 A1 | 10/2004 | Meyers et al. |

(Continued)

FOREIGN PATENT DOCUMENTS

| | | |
|---|---|---|
| DE | 19716586 C1 | 8/1998 |
| DE | 102006033951 | 10/2007 |

(Continued)

*Primary Examiner* — Clayton E Laballe
*Assistant Examiner* — Dennis Hancock
(74) *Attorney, Agent, or Firm* — Edward T. Kennedy

(57) ABSTRACT

A system for predicting tire lift-off propensity of a vehicle tire includes a vehicle tire-affixed tire-identification device for providing a tire-specific identification, multiple tire-affixed sensors mounted to the tire measuring tire-specific parameters and generating tire-specific parameter information, one or more vehicle-affixed sensor(s) mounted to the vehicle to measure vehicle speed and a lift-off propensity estimator generating a lift-off propensity for the vehicle tire from a database containing experimentally-derived, tire-ID specific, lift-off propensities correlated with measured tire-specific parameter information and vehicle speeds.

18 Claims, 10 Drawing Sheets

(56) References Cited

U.S. PATENT DOCUMENTS

| | | |
|---|---|---|
| 2004/0254707 A1 | 12/2004 | Lu et al. |
| 2005/0033486 A1 | 2/2005 | Schmitt et al. |
| 2005/0072223 A1 | 4/2005 | Fennel et al. |
| 2005/0085987 A1 | 4/2005 | Yokota et al. |
| 2005/0150283 A1 | 7/2005 | Shick |
| 2005/0177296 A1 | 8/2005 | Brown et al. |
| 2007/0010928 A1 | 1/2007 | Brusarosco et al. |
| 2007/0017727 A1 | 1/2007 | Messih et al. |
| 2008/0103659 A1 | 5/2008 | Mancosu |
| 2008/0140278 A1 | 6/2008 | Breed |
| 2009/0055040 A1 | 2/2009 | Nagaya |
| 2010/0063671 A1 | 3/2010 | Fink et al. |
| 2011/0060500 A1 | 3/2011 | Irth et al. |
| 2011/0199201 A1 | 8/2011 | Brusarosco et al. |
| 2013/0151075 A1 | 6/2013 | Moshchuk et al. |
| 2013/0211621 A1 | 8/2013 | Breuer et al. |
| 2015/0239298 A1 | 8/2015 | Kretschmann |

FOREIGN PATENT DOCUMENTS

| | | |
|---|---|---|
| DE | 102006043505 | 11/2007 |
| DE | 102007010780 | 12/2007 |
| DE | 102008046269 | 12/2009 |
| DE | 102010007008 | 8/2011 |
| EP | 2172760 A1 | 4/2010 |
| EP | 2301769 A1 | 3/2011 |
| WO | WO2011054363 A1 | 5/2011 |

TIRE LIFT-OFF PROPENSITY PREDICTIVE SYSTEM AND METHOD

FIELD OF THE INVENTION

The invention relates generally to tire monitoring systems for collecting measured tire parameter data during vehicle operation and, more particularly, to systems utilizing such tire sensor-based data in vehicle control systems.

BACKGROUND OF THE INVENTION

Under certain conditions, a vehicle tire may encounter a propensity to lift-off from a road surface. Lift-off may be caused by the tire hydroplaning during operation of the vehicle. Hydroplaning can occur when the contact patch created by a vehicle tire and a road surface is reduced in area due to the presence of moisture. In order to reduce hydroplaning, a reduction in travel speed of the vehicle is generally recommended. There is a need for a durable and robust system and method for advising a vehicle operator when conditions for tire lift-off exist so that a reduction in vehicle speed may be effected.

SUMMARY OF THE INVENTION

In one aspect of the invention, a system and method for predicting tire lift-off propensity includes a vehicle tire-affixed tire-identification device for providing a tire-specific identification, multiple tire-affixed sensors mounted to the tire measuring tire-specific parameters and generating tire-specific parameter information, one or more vehicle-affixed sensor(s) mounted to the vehicle to measure vehicle speed and a lift-off propensity estimator generating a lift-off propensity for the vehicle tire a database containing experimentally-derived, tire-ID specific, lift-off propensities correlated to measured tire-specific parameter information and measured vehicle speeds.

In another aspect, the tire-specific parameter information is one or more parameters from the group: a load estimation for the vehicle tire, air pressure within a cavity of the vehicle tire and a wear estimation for a tread region of the vehicle tire.

The lift-off propensity predictive system, in a further aspect, calculates the load estimation based upon a vehicle-based hub accelerometer signal.

The lift-off propensity predictive system in another aspect continuously updates the lift-off propensity of the vehicle tire during movement of the vehicle and uses the updated lift-off propensity in one or more control system(s) of the vehicle such as vehicle speed control.

DEFINITIONS

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Dugoff Model" is an empirical tire model providing analytical relations for the longitudinal and lateral forces as functions of the slip angle and slip ratio. It accounts for the coupling between the side and longitudinal forces.

"Equatorial Centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Piezoelectric Film Sensor" a device in the form of a film body that uses the piezoelectric effect actuated by a bending of the film body to measure pressure, acceleration, strain or force by converting them to an electrical charge.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

Similar numerals refer to similar parts throughout the drawings.

DETAILED DESCRIPTION OF THE INVENTION

Figure 1:
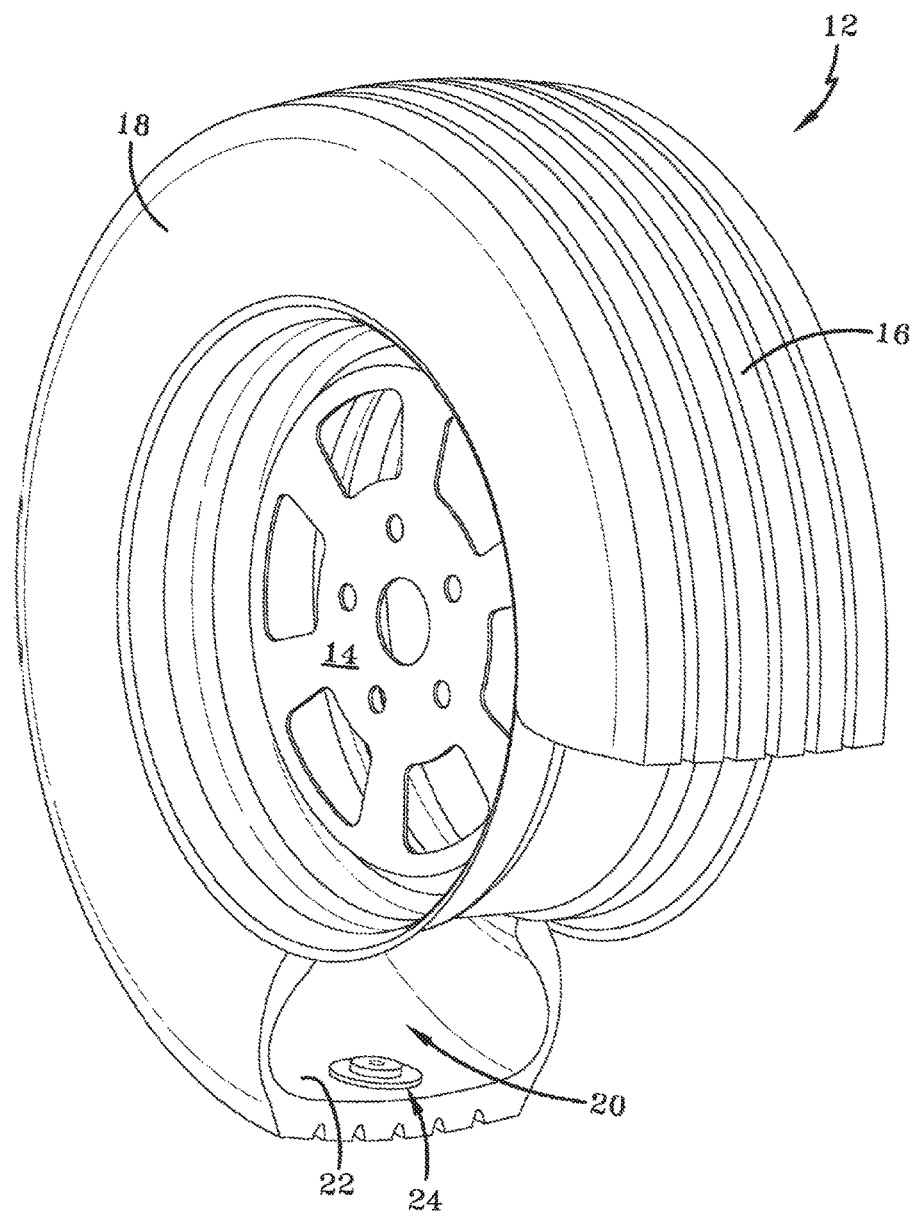
FIG. 1 is perspective view of a vehicle tire partially sectioned to show attachment of a TPMS sensor module.

Referring to FIG. 1, a vehicle exemplary tire 12 is shown. The tire 12 is one of several tires supporting a vehicle such as, but not limited to, a passenger automobile. The tire 12 is of conventional construction and is mounted to a wheel 14. The tire 12 has a tread region 16, sidewalls 18, a pressurized air cavity 20 defined by an inner liner 22. A sensor module 24, referred herein as tire pressure monitoring sensor (TPMS) module or "device", is mounted to the tire inner liner by suitable means such as adhesive. The TPMS sensor module 24 includes a pressure sensor for measuring the air pressure within cavity 20, temperature of the tire (if desired) and a tire identification transponder programmed to provide a tire-specific identification. The module 24 is further equipped with telemetric transmission capability by which the pressure, temperature and identification information can be sent wirelessly to a remote receiver (not shown) for processing. The module sensors are commercially available and packaged and may be affixed to the inner liner through the use of commercially available adhesive.

Figure 2:
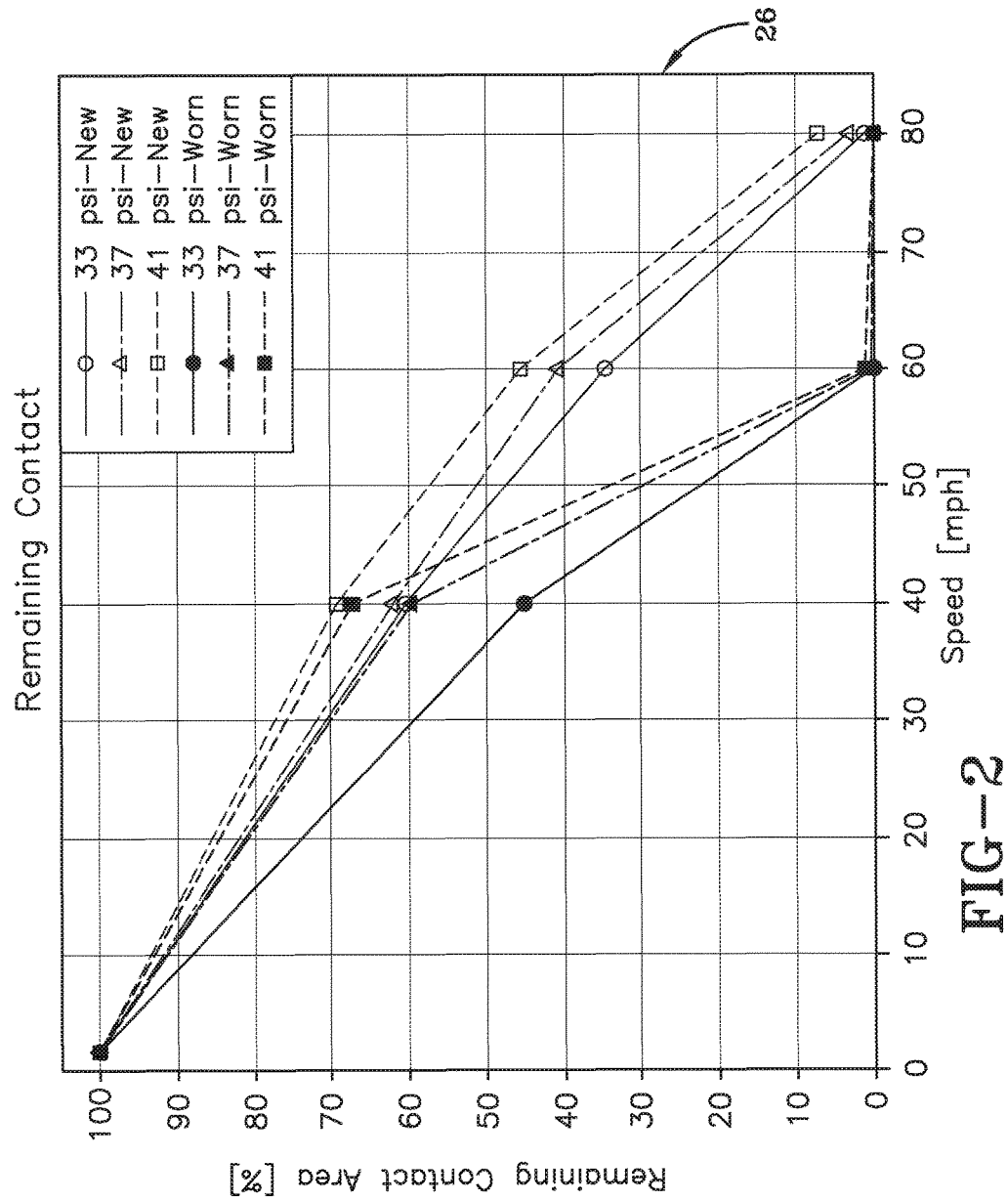
FIG. 2 is a graph of tire remaining contact (percent) vs. speed (mph) for a tire at varying tire pressures and varying wear states.

With reference to FIG. 2, a graph 26 of remaining contact area (percent) vs. speed of the vehicle (mph) is shown. The tire 12 makes a road-engaging contact patch as the tire rotates along a road surface. The "contact patch" area is a function of tire inflation pressure, tire loading, vehicle speed, tire construction and the wear state of the tire. The graphs in FIG. 2 demonstrates that variation in tire inflation pressures (33, 37, 41 psi) and the wear state (worn vs. new) of the tire tread has a direct influence on the contact area of the tire as it contacts a road surface at speeds ranging from 0 to 80 mph. In general, the greater the inflation pressure, the less contact area is created. The faster a vehicle, and hence the tire, travels, the less contact area is established by the tire against the road surface.

The contact area of the tire is inversely proportional to the lift-off tendency of the tire. That is, the greater the contact area of the tire is against the road surface, the lower the lift-off tendency of the tire from the road surface. "Lift-off tendency" is most commonly experienced and exacerbated when a material or liquid (hydroplaning) is present between the tire and the road surface resulting in a reduction of contact area between the tire the road surface. From the test result graphs of FIG. 2, it will be appreciated that the inflation pressure and tire wear state dependencies are useful for predicting tire lift-off conditions. The loading conditions will also affect the curves of FIG. 2 since the contact patch area changes with tire load. Tire ID Information reveals the particular tire-specific construction of the tire. The tire-specific identification, in turn, makes the curves and algorithms of FIG. 2 tire-specific. "Remaining contact area" curves will change dramatically for a stiff tire vs. a less stiff tire. By identifying the tire and its construction parameters, tire-specific remaining contact area curves may be generated from tire-specific measurement of tire inflation pressure, load and vehicle speed.

Figure 3:
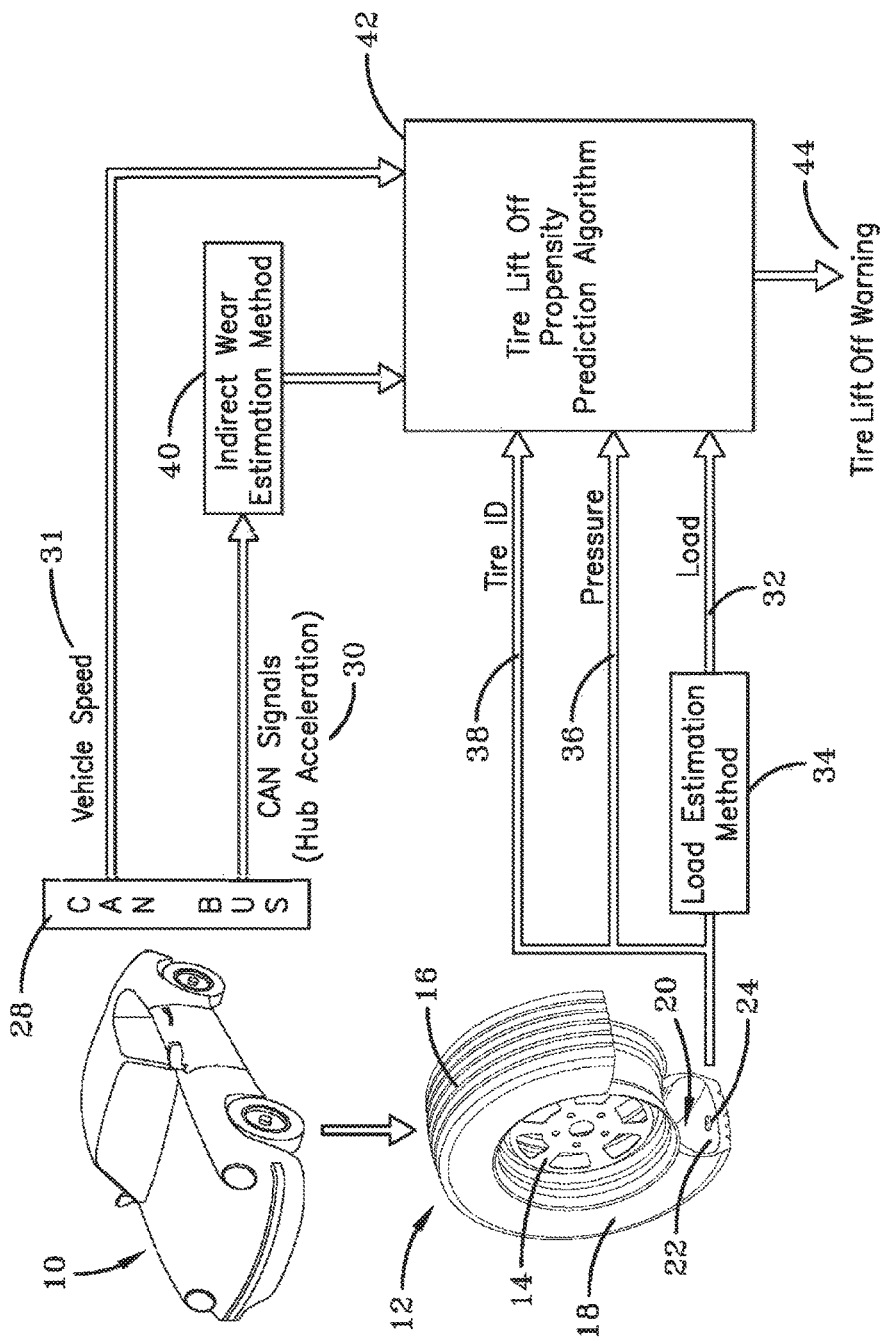
FIG. 3 is an implementation flow diagram of the subject system for predicting tire lift-off propensity.

In FIG. 3, an Implementation Flow Diagram of the subject system and method for estimating lift-off propensity is shown. A vehicle 10 is supported by multiple tires 12 configured and described above in reference to FIG. 1. From vehicle-based sensors such as vehicle-mounted accelerometers, vehicle-based information is conveyed to a tire lift-off propensity estimator 42 via the vehicle CAN bus signals 28. Vehicle-based information includes vehicle speed 31 and hub acceleration 30. The CAN signal hub acceleration 30 is input into an indirect wear estimation method 40 that estimates the wear state of the tires.

Tread depth or wear state may be determined directly from tire tread-mounted sensors or from an adaptive indirect tread wear such as the wear estimation method found in U.S. Pat. No. 9,050,864, entitled TIRE WEAR STATE ESTIMATION SYSTEM AND METHOD, owned by the same Assignee as the present application and hereby incorporated by reference in its entirety herein. The wear estimation method of the co-pending application does so "indirectly", that is, without the use of tire mounted tread depth measuring sensors. As such, the difficulty of implementing and maintaining accurate tire-based sensor tread depth measurement is avoided. The indirect tire wear state estimation algorithm utilizes the hub acceleration signal 30 which is accessible via the vehicle CAN bus 28 from vehicle based sensors. The hub acceleration signal is analyzed and an estimation is made as to tread depth or wear. The tread depth used may be the percentage tread wear left or a quantitative value of tread wear depth left on the tire.

From tire-based sensors packaged within the TPMS module 24, tire ID 38, tire cavity inflation pressure 36, and tire load measurement 32 are derived and transmitted for processing to the tire lift-off propensity estimator 42. The load 32 is estimated from a load estimation method 34 incorporating a dynamic tire load estimator configured as presented in U.S. Pat. No. 9,222,854, entitled VEHICLE DYNAMIC LOAD ESTIMATION SYSTEM AND METHOD, owned by the same Assignee as the present application and hereby incorporated herein in its entirety. The tire-based inputs of tire ID, pressure and load constitute tire-based information inputs into the estimator 42, which employs a tire lift-off propensity prediction algorithm.

The estimator 42 includes a tire-specific database experimentally derived and based upon a tire ID. From the tire ID, the type of tire construction is known. The tire ID obtained from the TPMS module 24 allows the estimator to identify the tire and recognize the specific type of construction. The reference database utilizes the pressure 36, load estimation 32, vehicle speed 31 and indirect wear estimation 40 to determine the contact patch for the tire. From the contact patch area tire lift-off propensity is concluded by the estimator 42. Should the tire lift-off propensity exceed a preset threshold limit, a warning 44 is generated to the driver of the vehicle and/or the vehicle controller. The driver, being warned of a high lift-off propensity, may take remedial action by reducing the vehicle speed. The controller can redistribute the force to a tire with a larger contact patch area (higher road holding capacity) and thereby mitigate the propensity for tire lift-off. By calculating lift-off propensity for each tire, the controller can manage the distribution of force between tires and thereby reduce the potential for lift-off.

Figure 4:
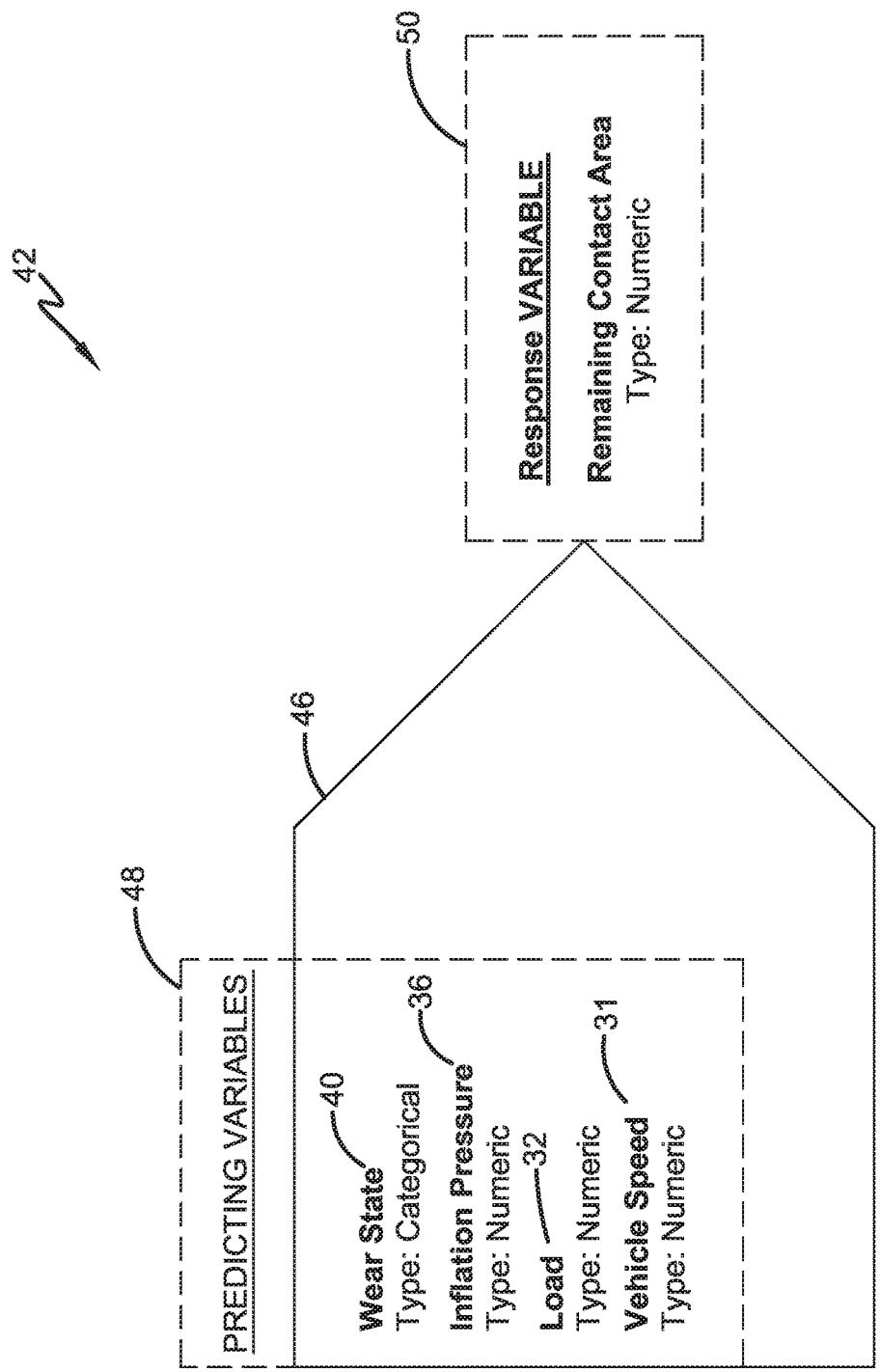
FIG. 4 is a diagram of an algorithm employed in a tire lift-off propensity estimator.

Turning to FIG. 4, the data in the database of the estimator 42 may be calculated by a regression model 46. The regression model 46 employs predicting variables 48, which include the wear state or wear estimation 40, the tire inflation pressure 36, the load estimation 32 and the vehicle speed 31 to determine a response variable 50, which is the predicted contact patch area. While any regression model 46 known to those skilled in the art may be employed, including linear and non-linear regression models, non-linear regression models are preferred due to their greater prediction accuracy.

Figure 5:
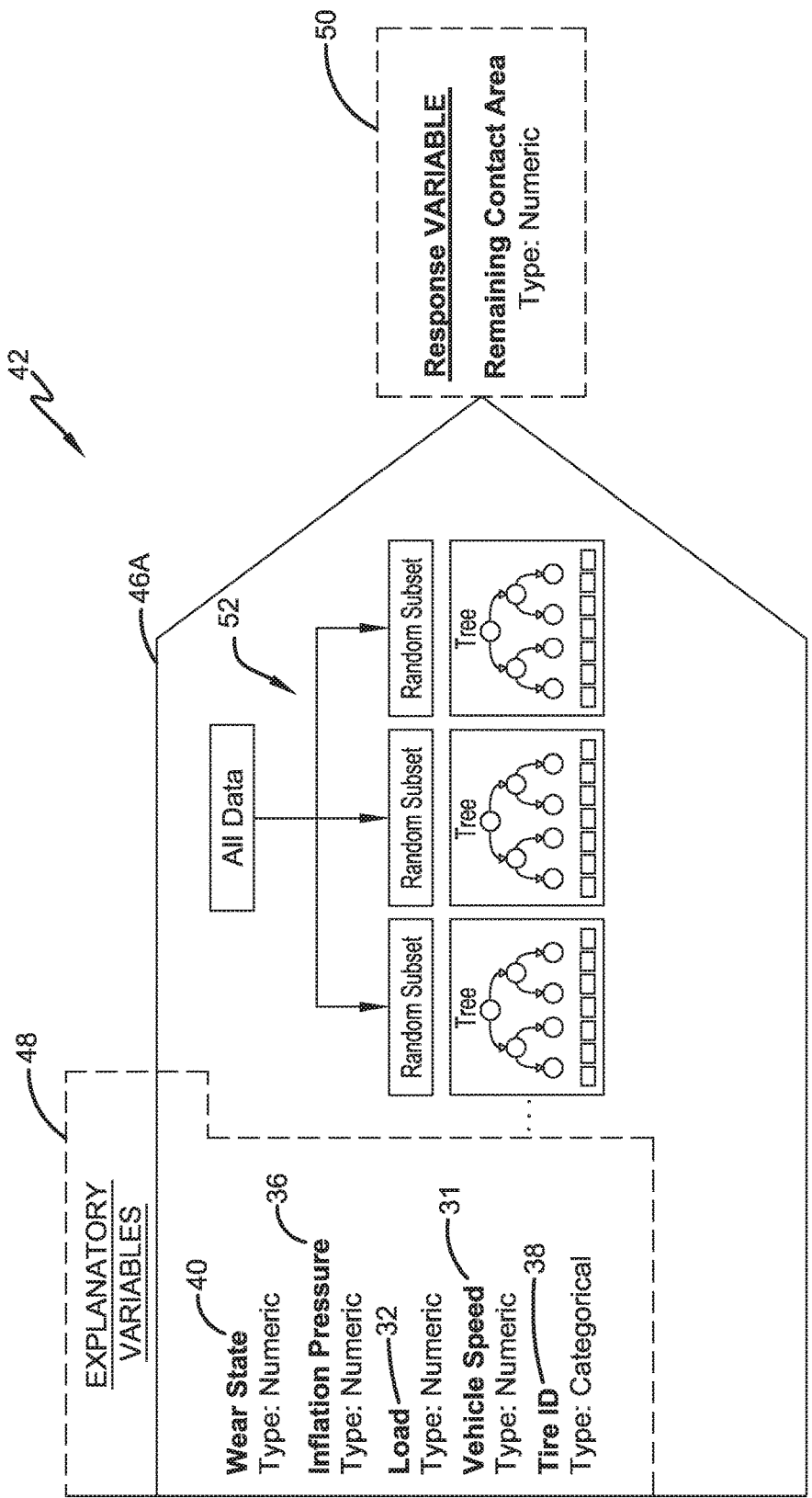
FIG. 5 is a diagram of an exemplary embodiment of a preferred algorithm employed in a tire lift-off propensity estimator.
Figure 6:
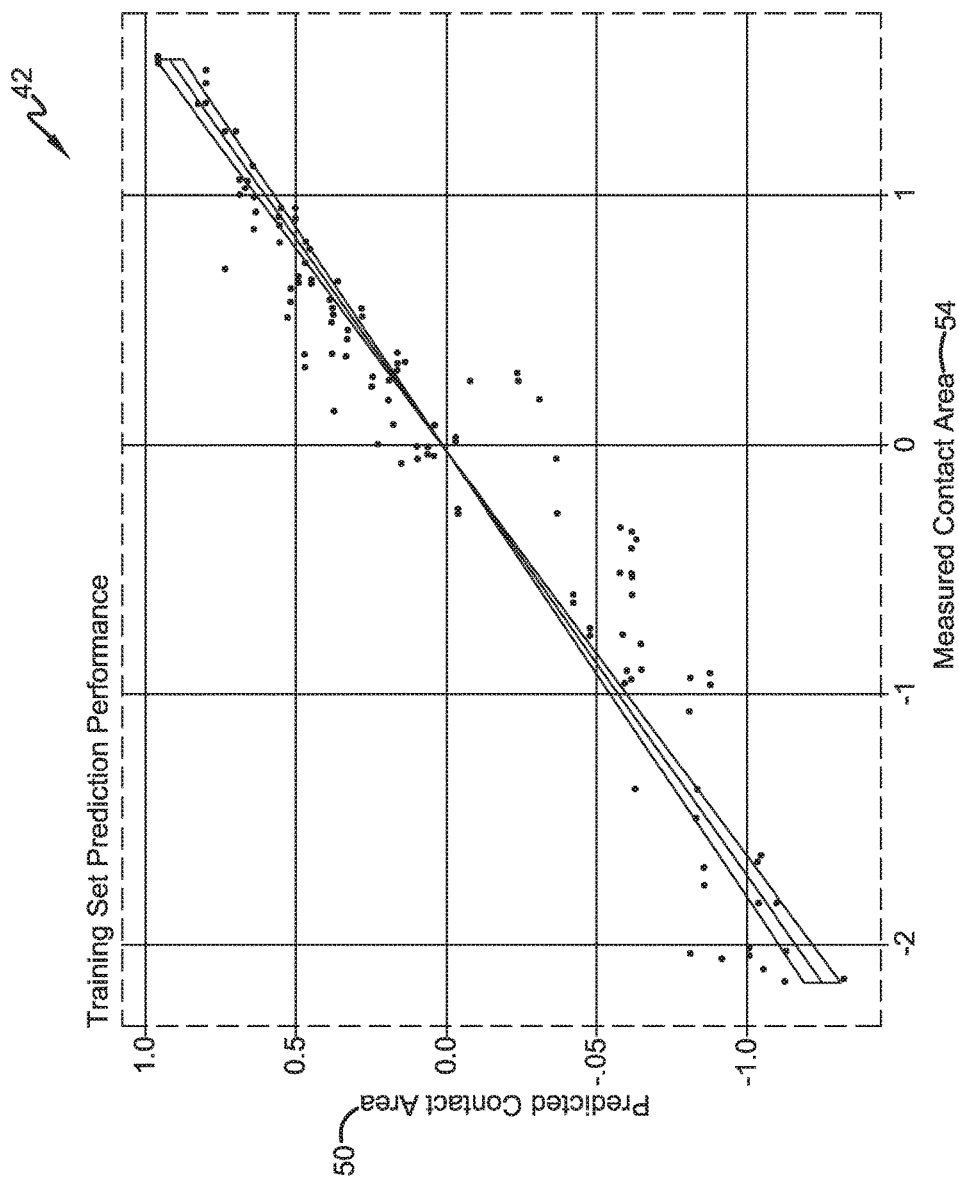
FIG. 6 is a graph correlating predicted contact area from the exemplary embodiment of the preferred algorithm to the measured contact area.
Figure 7:
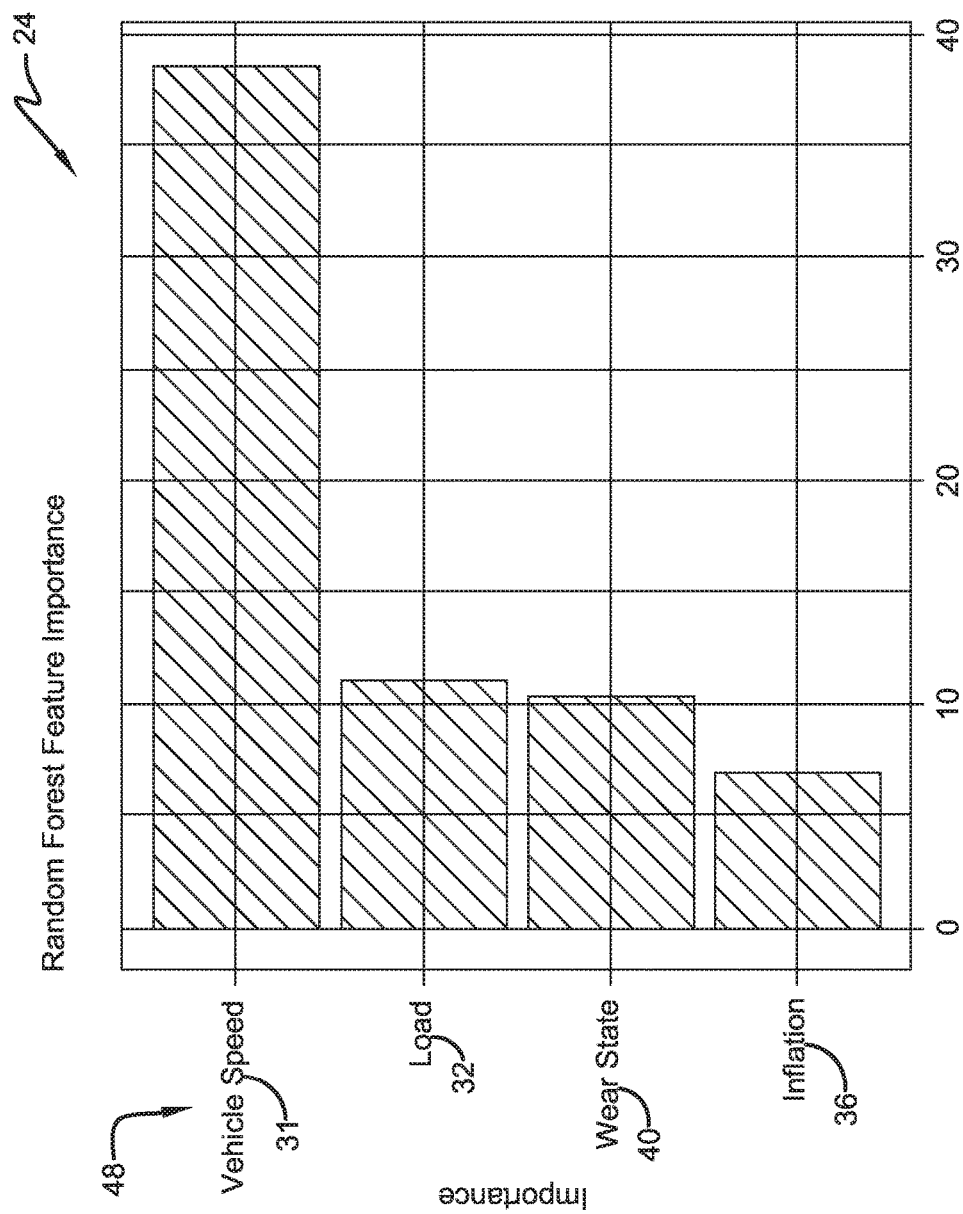
FIG. 7 is a bar graph indicating the relative rank of importance of variables in the exemplary embodiment of the preferred algorithm.

A preferred non-linear regression model 46A is shown in FIG. 5, which is a random forest regression algorithm employing decision trees. The random forest regression algorithm 46A employs predicting or explanatory variables 48 of the wear state estimation, the inflation pressure 36, the load estimation 32, the vehicle speed 31 and the tire ID 38. The explanatory variables 48 are used to create decision trees 52, which the algorithm 46A uses to generate the response variable 50 of the predicted contact patch area. FIG. 6 shows the accuracy of the predicted contact area 50 using the random forest regression algorithm 46A, and FIG. 7 indicates and ranks the importance of each of the explanatory variables 48.

Figure 8:
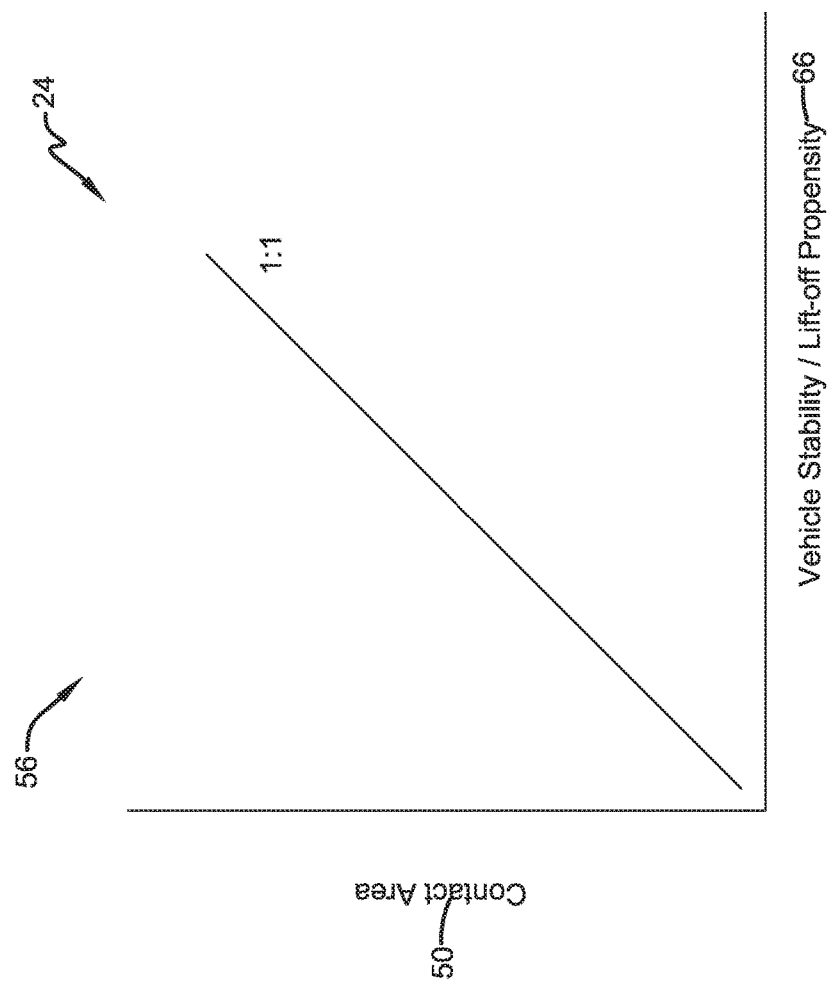
FIG. 8 is a graph correlating predicted contact patch area to lift off propensity.

Once the regression model 46 generates the predicted contact patch area 50, the estimator 42 correlates the predicted contact patch area to the lift off propensity 66. Turning to FIG. 8, table 56 shows that there is a linear 1:1 relationship between the contact patch area 50 and the lift off propensity 66. As a result of this linear relationship, the estimator directly correlates the contact patch area 50 to the lift off propensity 66 using means such as the table 56 or a linear formula.

Figure 10:
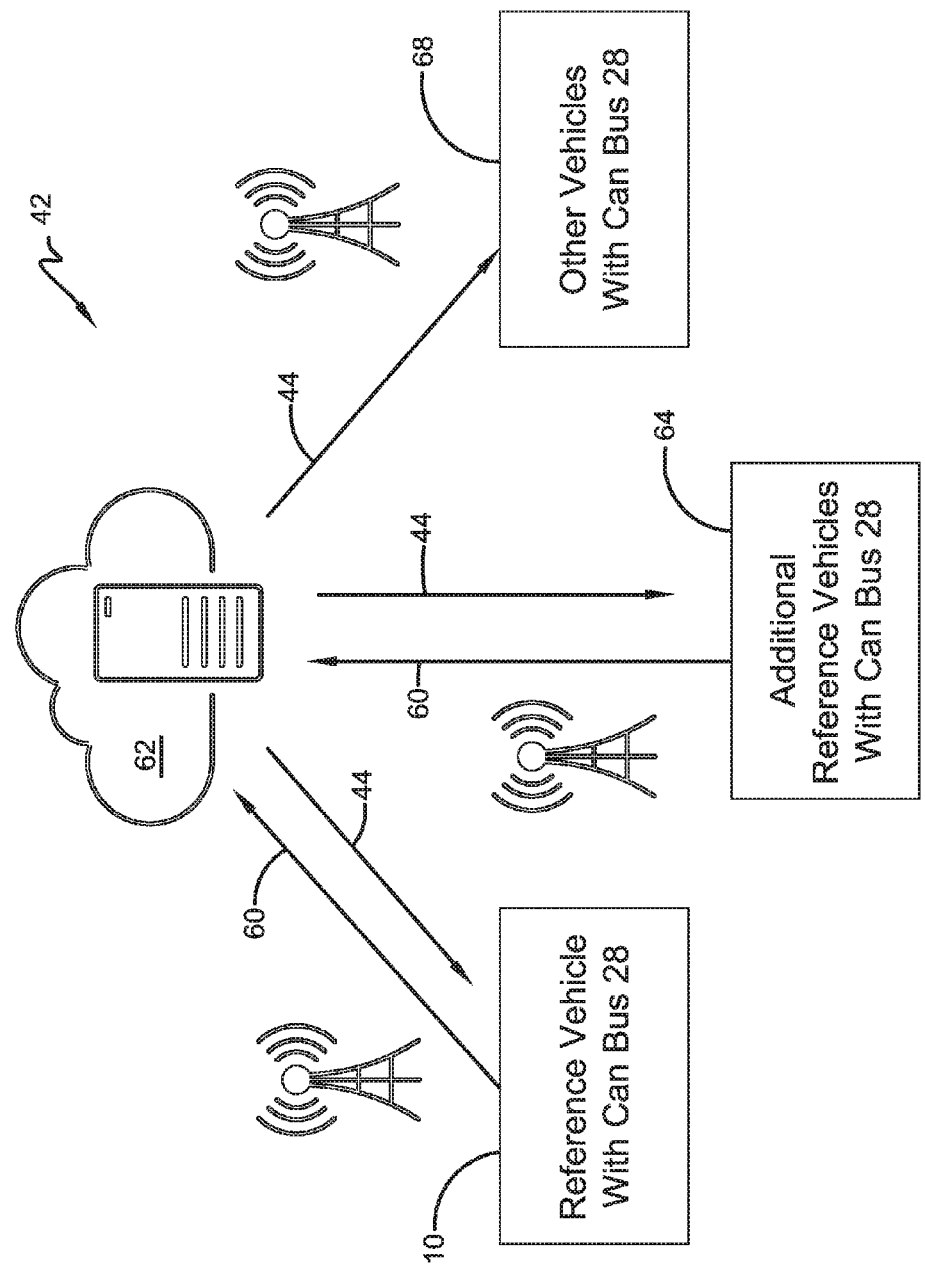
FIG. 10 is a diagram of the coordination of information from multiple vehicles to transmit a lift-off propensity warning.

Information regarding lift-off propensity or hydroplaning may be sensed in the vehicle 10 as a reference vehicle, with the lift off propensity warning 44 being transmitted to the drivers of other vehicles. For example, the reference vehicle 10 is equipped with an electronic stability program (ESP), which is in electronic communication with the vehicle CAN bus 28 as known to those skilled in the art. As shown in FIG. 10, if the ESP senses a loss of vehicle stability in the reference vehicle 10, a loss of stability signal and corresponding tire state information 60 may be transmitted by the vehicle CAN bus 28 to a cloud-based or a central processor 62. The cloud-based or central processor 62 compares the loss of stability signal and tire state information 60 from the reference vehicle 10 to signals from additional reference vehicles 64 in the same geographic area. If any of the additional reference vehicles 64 indicate a loss of stability and/or tire state information 60 consistent with hydroplaning, the cloud-based or central processor transmits the lift off propensity warning 44 to the drivers of the additional reference vehicles, and optionally to other vehicles in the area 68 and the original reference vehicle 10.

Figure 9:
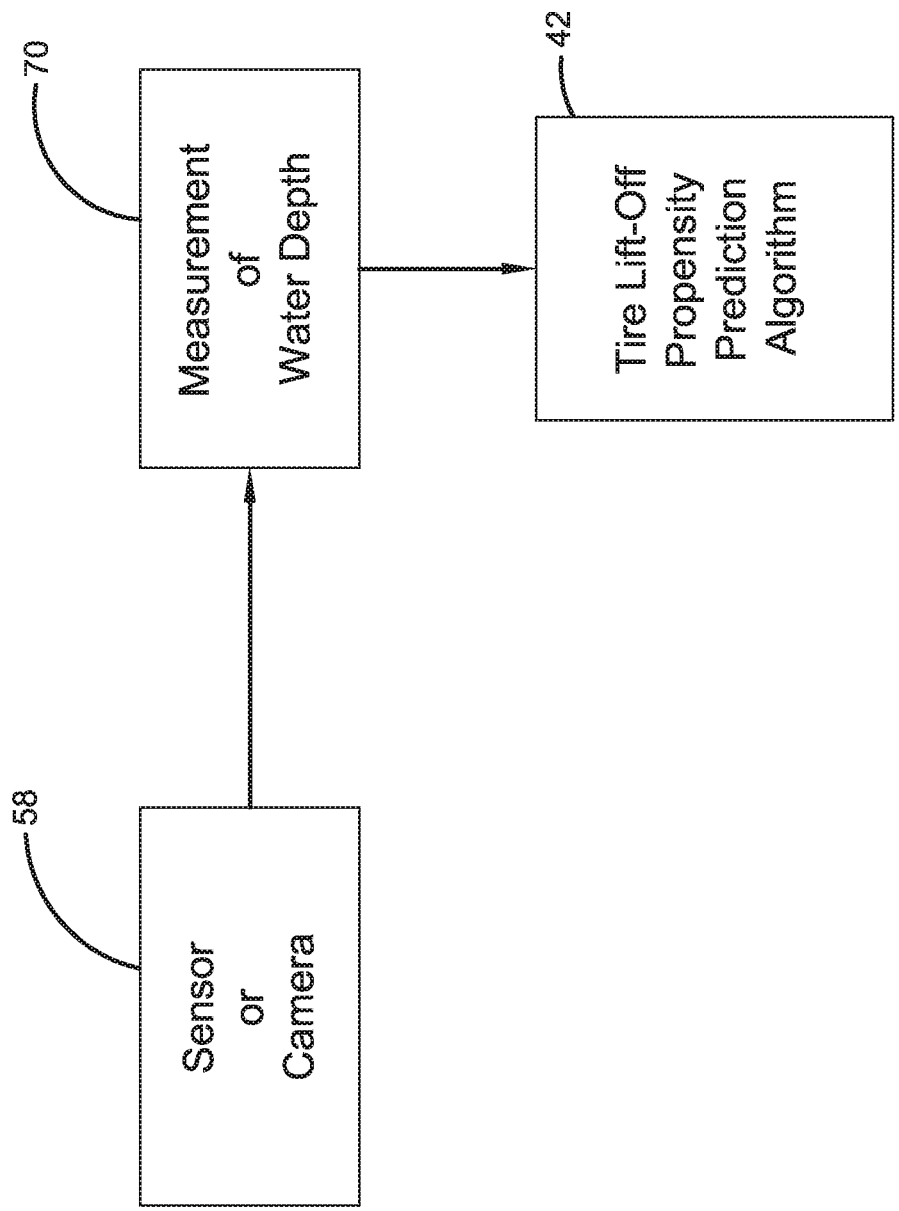
FIG. 9 is a flow diagram showing the implementation of a water depth measurement in the tire lift-off propensity estimator.

Referring now to FIG. 9, the vehicle 10 may also be equipped with a forward-viewing camera or a sensor 58 that is capable of measuring the depth of water on the road and generating a measurement of water depth 70. The measurement of water depth 70 is optionally included as another predicting or explanatory variable 48 to be employed in the algorithm 46 and the estimator 42. In addition to providing an additional variable 48, such a measurement 70 may be employed in the above-described pro-active communication of the lift off propensity warning 44 to the drivers of multiple vehicles 68.

From the foregoing, it will be appreciated that the subject system and method achieves a tire lift-off propensity prediction which is both accurate and tire-specific. A vehicle tire-affixed tire-identification device within the module 24 provides a tire-specific identification. Multiple tire-affixed sensors within the module 24 are mounted to the tire to measure and provide certain tire-specific parameters (pressure, load, wear state). Tire-specific parameter information (wear state, pressure, load) are inputs with vehicle-based sensor derived vehicle speed into the estimator 42. The tire lift-off propensity estimator 42 fits the inputs into a database that is based upon tire ID recognition. The estimator 42 generates a lift-off propensity for the vehicle tire based on the recognized tire ID. Lift-off propensities are thereby concluded from a correlation of the specific tire-based parameter information and measured vehicle speeds with the recognized Tire ID.

The tire-specific parameter information combines a load estimation for the vehicle tire, air pressure within a cavity of the vehicle tire and a wear estimation for a tread region of the vehicle tire as inputs into the estimator 42. The lift-off propensity predictive system continuously updates the lift-off propensities of the vehicle tires during movement of the vehicle and uses the updated lift-off propensities in one or more control system(s) of the vehicle such as driver initiated vehicle speed control and/or vehicle controller-driven force distribution between vehicle tires.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A lift-off propensity predictive system comprising:
 a vehicle supported by at least one vehicle tire mounted to a hub, the vehicle tire including a tire cavity and a ground-engaging tread, and the tire including a plurality of tire-specific measureable parameters;
 a plurality of tire-affixed sensors mounted to the tire operably measuring the tire-specific parameters and generating tire-specific parameter information;

a tire-affixed tire-identification device for providing a tire-specific identification;

at least one vehicle-affixed sensor mounted to the vehicle operably measuring vehicle speed;

a lift-off propensity estimator operable to generate a lift-off propensity for the one vehicle tire, the lift-off propensity being correlated to a predicted tire contact patch area, wherein the predicted tire contact patch area is calculated from the tire-specific parameter information, the tire-specific identification and the vehicle speed; and means to generate a lift off propensity warning for the vehicle.

2. The lift-off propensity predictive system for a tire according to claim 1, wherein the tire-specific parameter information is from the group:

a load estimation for the one vehicle tire;

air pressure within a cavity of the one vehicle tire; and a wear estimation for a tread region of the one vehicle tire.

3. The lift-off propensity predictive system according to claim 2, wherein the load estimation operably calculates a load estimation based upon a vehicle-based hub accelerometer signal.

4. The lift-off propensity predictive system of claim 1, wherein the lift-off propensity substantially continuously updated during an movement of the vehicle.

5. The lift-off propensity predictive system of claim 1, wherein the lift-off propensity is correlated to the predicted tire contact patch area through a linear relationship between the lift-off propensity and the predicted tire contact patch.

6. The lift-off propensity predictive system of claim 1, wherein the predicted tire contact patch area and the lift-off propensity are stored in a database.

7. The lift-off propensity predictive system of claim 1, wherein the predicted tire contact patch area is calculated using a regression model.

8. The lift-off propensity predictive system of claim 7, wherein the predicted tire contact patch area is calculated using a non-linear regression model.

9. The lift-off propensity predictive system of claim 8, wherein the predicted tire contact patch area is calculated using a random forest regression algorithm.

10. The lift-off propensity predictive system of claim 1, further comprising means for measuring a water depth on a road travelled by the vehicle, wherein the calculation of the predicted tire contact patch area includes the measured water depth.

11. A lift-off propensity predictive system comprising:

a vehicle supported by at least one vehicle tire mounted to a hub, the vehicle tire including a tire cavity and a ground-engaging tread, and the tire including a plurality of tire-specific measureable parameters;

a plurality of tire-affixed sensors mounted to the tire operably measuring the tire-specific parameters and generating tire-specific parameter information;

a tire-affixed tire-identification device for providing a tire-specific identification;

at least one vehicle-affixed sensor mounted to the vehicle operably measuring vehicle speed;

a lift-off propensity estimator operable to generate a lift-off propensity for the one vehicle tire, the lift-off propensity being correlated to a predicted tire contact patch area, wherein the predicted tire contact patch area is calculated from the tire-specific parameter information, the tire-specific identification and the vehicle speed; and means to generate a lift off propensity warning to multiple vehicles.

12. A method of making a lift-off propensity estimation comprising:

mounting at least one vehicle tire to a vehicle, the vehicle tire having a tire cavity and a ground-engaging tread, and the tire having a plurality of tire-specific measureable parameters;

affixing to the one vehicle tire a tire identification device providing a tire-specific identification;

affixing at least one vehicle-affixed sensor to the vehicle operably measuring vehicle speed;

mounting a plurality of tire-affixed sensors to the tire operably measuring the tire-specific parameters to generate tire-specific parameter information;

inputting the tire-specific parameter information and the tire-specific identification and the vehicle speed into a lift-off propensity estimator;

calculating a predicted tire contact patch area from the tire-specific parameter information, the tire-specific identification and the vehicle speed with the lift-off propensity estimator;

correlating the predicted tire contact patch area to a lift-off propensity for the one vehicle tire; and generating a lift off propensity warning for the vehicle.

13. The method according to claim 12, wherein the tire-specific parameter information includes a load estimation for the one vehicle tire, air pressure within a cavity of the one vehicle tire and a wear estimation for a tread region of the one vehicle tire.

14. The method according to claim 12, further comprising utilizing a vehicle-based accelerometer signal to generate the load estimation for the one vehicle tire.

15. The method according to claim 12, wherein the lift-off propensity is correlated to the predicted tire contact patch area through a linear relationship between the lift-off propensity and the predicted tire contact patch.

16. The method according to claim 12, wherein the predicted tire contact patch area is calculated using a regression model.

17. The method according to claim 12, further comprising measuring a water depth on a road travelled by the vehicle, wherein the calculation of the predicted tire contact patch area includes the measured water depth.

18. The method according to claim 12, further comprising generating a lift off propensity warning to multiple vehicles.

* * * * *